United States Patent [19]

Hartmann et al.

[11] Patent Number: 5,238,384
[45] Date of Patent: Aug. 24, 1993

[54] APPARATUS FOR PRODUCING A COMPOSITE PIPE IN A ROTATING DRUM

[75] Inventors: Peter Hartmann, Feldmeilen; Bernhard Bergmann, Balsthal, both of Switzerland

[73] Assignee: Von Roll AG, Gerlafingen, Switzerland

[21] Appl. No.: 734,466

[22] Filed: Jul. 23, 1991

Related U.S. Application Data

[62] Division of Ser. No. 455,616, Dec. 22, 1989, Pat. No. 5,082,614.

[30] Foreign Application Priority Data

Dec. 23, 1988 [CH] Switzerland .................. 04787/88

[51] Int. Cl.⁵ .................. B28B 21/80; B29C 41/04
[52] U.S. Cl. .................. 425/183; 249/100; 249/102; 425/112; 425/115; 425/192 R; 425/435; 425/DIG. 218
[58] Field of Search .................. 249/100, 101, 102; 425/110, 112, 115, 117, 130, 183, 190, 192 R, 435, DIG. 218

[56] References Cited

U.S. PATENT DOCUMENTS

| | | | |
|---|---|---|---|
| 1,181,198 | 5/1916 | Zwicker | 249/78 |
| 1,346,411 | 7/1920 | Massey | 425/435 |
| 1,374,730 | 4/1921 | Gruenfeld | 425/435 |
| 3,237,954 | 3/1966 | Franklin | 277/237 |
| 3,683,061 | 8/1972 | Gates | 264/317 |
| 3,714,312 | 1/1973 | Nitta et al. | 264/317 |
| 3,884,269 | 5/1975 | Schetty et al. | 138/137 |
| 3,953,629 | 4/1976 | Wesch | 428/36 |
| 3,957,410 | 5/1976 | Goldsworthy et al. | 425/435 |
| 4,305,564 | 12/1981 | Jensen | 249/100 |
| 4,358,264 | 11/1982 | Yamamoto et al. | 425/425 |
| 4,449,912 | 5/1984 | Ogura | 425/444 |
| 4,714,578 | 12/1987 | Cagle et al. | 264/255 |
| 4,752,203 | 6/1988 | Kanzaki | 425/182 |
| 4,762,485 | 8/1988 | Kanzaki | 425/434 |

FOREIGN PATENT DOCUMENTS

| | | |
|---|---|---|
| 496163 | 8/1977 | Australia . |
| 1232212 | 2/1988 | Canada . |
| 0151930 | 8/1985 | European Pat. Off. . |
| 1285801 | 12/1968 | Fed. Rep. of Germany . |
| 3638547 | 5/1988 | Fed. Rep. of Germany . |
| 661826 | 3/1965 | France . |
| 1592936 | 6/1970 | France . |
| 1474293 | 5/1977 | United Kingdom . |
| 1475982 | 6/1977 | United Kingdom . |

*Primary Examiner*—Jay H. Woo
*Assistant Examiner*—James P. Mackey
*Attorney, Agent, or Firm*—Weingarten, Schurgin, Gagnebin & Hayes

[57] ABSTRACT

The components forming the layers of a composite pipe are successively introduced into a rotary drum (1). Initially, a plastic reinforcing layer (8), including a fibre reinforcement, is introduced into the drum, the ends of the drum (1) being bounded by rings. A concrete core layer (16) is then introduced and the length of the core layer (16) is shortened relative to that of the drum (1) by shaping rings fixed to the drum ends. The shaping rings are then replaced by other shaping rings (20, 21) so that, on either side of the core layer (16), two annular spaces (22, 23) are formed which are filled by a socket material (24, 25) of the same composite as the reinforcing layer (8). Thus, at one pipe end a socket end (28) is formed and at the other pipe end a spigot end (30) is formed, each such end being located within the composite pipe wall thickness. After introducing a second reinforcing layer (26), the production of the composite pipe is completed. By producing the socket connecting elements (28, 30) simultaneously with the construction of the composite pipe, a reliable and rational production of the composite pipe with its socket connecting elements (28, 30) is achieved. By shaping a shoulder (33) on to the spigot end (30), when sliding together two composite pipes, the socket end (28) is centered. Simultaneously, an annular space (34) is formed, in which can be inserted an elastic seal (35) for drip-tight sealing.

8 Claims, 6 Drawing Sheets

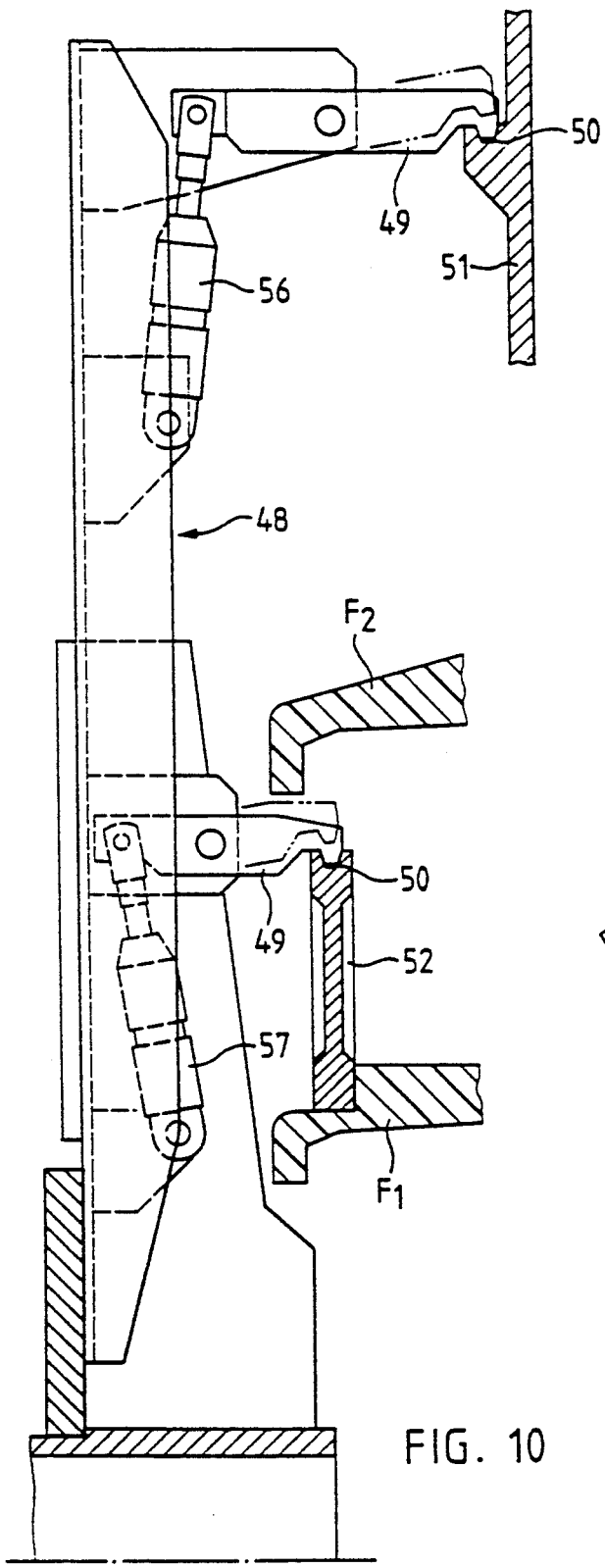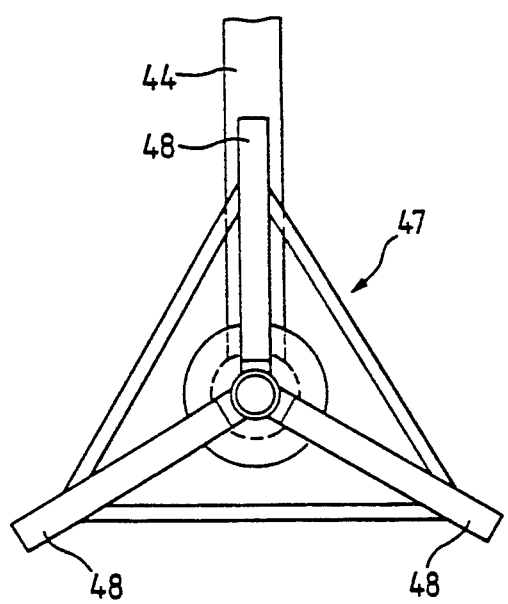
FIG. 9
FIG. 10

APPARATUS FOR PRODUCING A COMPOSITE PIPE IN A ROTATING DRUM

This application is a division of application Ser. No. 07/455,616, filed Dec. 22, 1989, now U.S. Pat. No. 5,082,614.

FIELD OF THE INVENTION

The invention relates to a method for producing a composite pipe comprising several layers of organic and inorganic material in a rotating drum and, more specifically, to producing a composite pipe having socket connecting elements at the pipe ends provided on both the outer and inner wall sides thereof, having a plastic reinforcing layer including a fibre reinforcement and an interposed core layer of inorganic material with a binder, particularly concrete.

BACKGROUND OF THE INVENTION

Numerous different constructions of pipes made from non-metallic materials are known. Compared with pipes made from metallic materials such pipes have many advantages, e.g. lower weight and higher corrosion resistance. Due to the latter property, such pipes are used for the carrying of corrosive material. Such non-metallic pipes can also be laid in the ground, where metal pipes are subject to strong corrosion.

Pipes made entirely from plastic materials are known and the corresponding characteristics of these plastics can be advantageously utilized. They have a low weight and, in most cases, an adequate strength, but are relatively expensive. Thus, efforts have been made to reduce the costs of such pipes without impairing the characteristics of the plastics used. Such a pipe is disclosed in EP 0 151 930. The wall of this pipe is formed from several layers built up from plastic and inorganic materials. The pipe of that patent essentially comprises a cement mortar core layer, which is surrounded by a reinforcing layer both on the inner and outer wall sides. The two reinforcing layers comprise a plastic material, e.g. a polyester, which is reinforced by means of fibres, e.g. glass fibres. Such pipes have advantages compared with purely plastic pipes in that they are less expensive than purely plastic pipes, have the same corrosion characteristics as purely plastics pipes, and have a lower weight than metal pipes.

In order that such pipes can be assembled with standard connecting or joining elements, information is given in the above-referenced industrial property right as to how the pipes can be provided with socket or sleeve connecting elements. A socket end is shaped on to one pipe end having an external diameter larger than the pipe diameter by at least twice the wall thickness. Thus, the space required for laying the same is very large and, consequently, is not cost effective. Moreover, the rotating drum in which such pipes are produced, must be shaped in accordance with the socket at the drum end which also leads to additional costs.

Admittedly, the above-referenced industrial property right describes an additional pipe, in which no use is made of a socket with a larger diameter than the pipe diameter, but rather requiring a metal ring which is inserted at one drum end and connected to the pipe body. However, in this latter embodiment it is very difficult to achieve a good connection between said metal ring and the pipe body. Further, this metal ring is also exposed to corrosion, thereby negating the advantage of the nonmetallic pipe body. Thus, this type of pipe connection has not received practical acceptance.

The problem solved by the present invention is to further develop a method of the aforementioned type such that a composite or compound pipe with socket connecting elements can be produced in which said elements are also made from nonmetallic materials and do not project over the pipe body diameter, while maintaining a strength between the socket connecting elements and the pipe body that is comparable to that of the pipe body. According to the present invention this problem is solved by simultaneously constructing a composite layered pipe body wherein one pipe end is provided with a socket end having a projection and the other pipe end is provided with a spigot end having an offset, and further wherein the shaping of the pipe ends of the socket material corresponds to that of the reinforcing layer of the pipe body.

The present invention also covers an apparatus enabling the production of composite pipes with socket connecting elements in an optimum manner. According to the present invention this problem is solved in that the shaping rings required for shaping the socket connecting elements at the pipe ends are stored over at least one horizontally mounted drum in a magazine. These shaping rings are successively brought to the drum end corresponding to the construction of the composite pipe by means of handling devices, at least one of which is set up at each drum end. The shaping rings are fixed to the drum, and subsequently replaced and returned to the magazine by means of the handling devices.

BRIEF DESCRIPTION OF THE DRAWINGS

The invention is described in greater detail hereinafter relative to a non-limitative embodiment and the attached drawings, in which:

FIGS. 1 to 4 are diagrammatic representations of the stepwise construction of a composite pipe with socket connecting elements in a partially shown rotating drum, wherein:

FIG. 1 shows the production of the connecting layer;

FIG. 2 shows the introduction of the core layer;

FIG. 3 shows the production of the socket connecting elements;

FIG. 4 shows the extension of the finished composite pipe from the stationary drum;

FIG. 9 is a view of a shaping ring gripper;

FIG. 10 is a partially sectional side view of a gripping arm; and

DETAILED DESCRIPTION OF THE INVENTION

Figure 1:
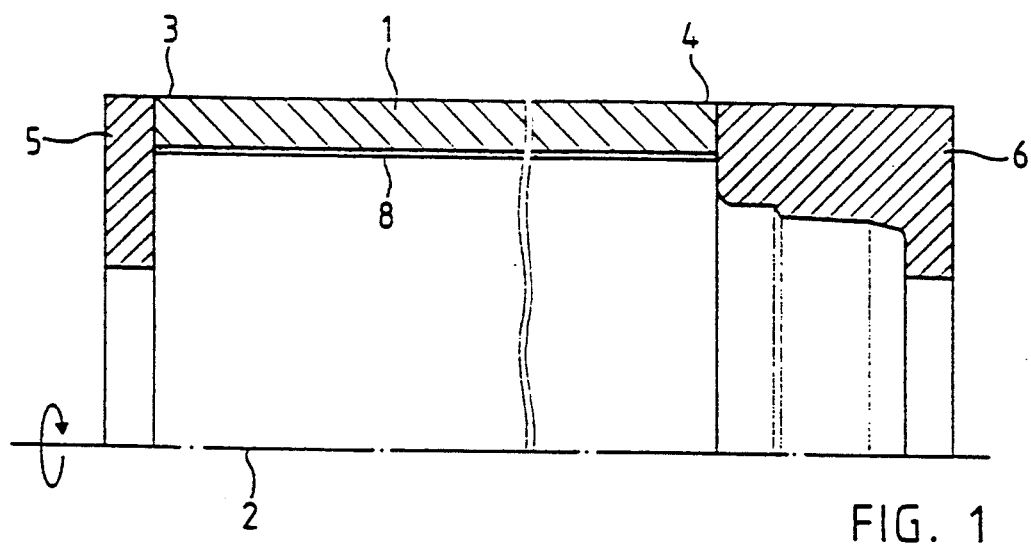
Figure 2:
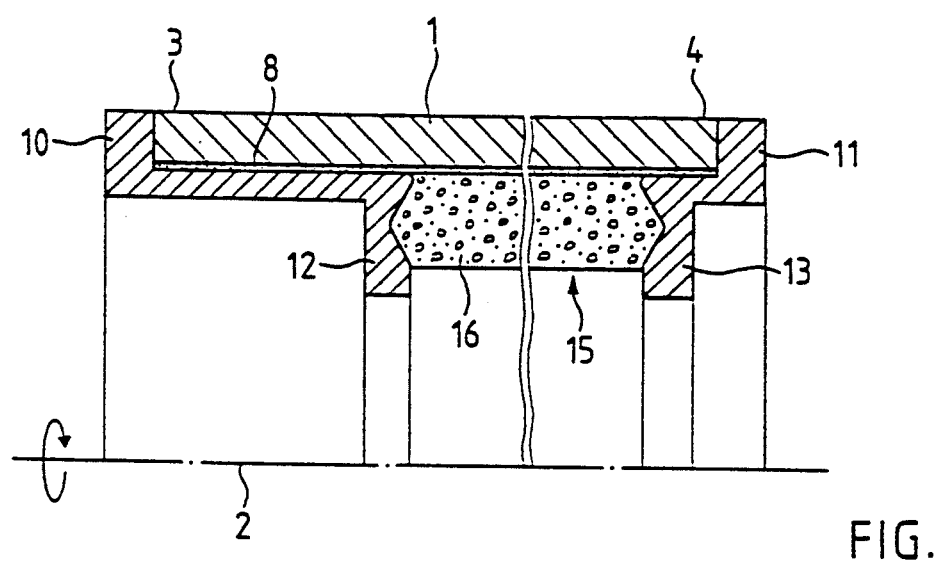

The invention is based on the consideration that a composite pipe essentially comprising a core layer of inorganic material and a plastic reinforcing layer on both the inner and outer wall sides can only prove satisfactory in practice if the connecting elements, preferably the sleeve or socket connecting elements, have a reliable connection with the pipe body.

FIGS. 1 to 4 show the construction of such a composite pipe with socket connecting elements. In FIGS. 1 to 4, reference numeral 1 is a rotating drum, which is arranged with a horizontal rotation axis and is rotatably mounted in a machine frame. The construction of the drum 1 is assumed to be known in the art in view of the age of such means.

Figure 3:
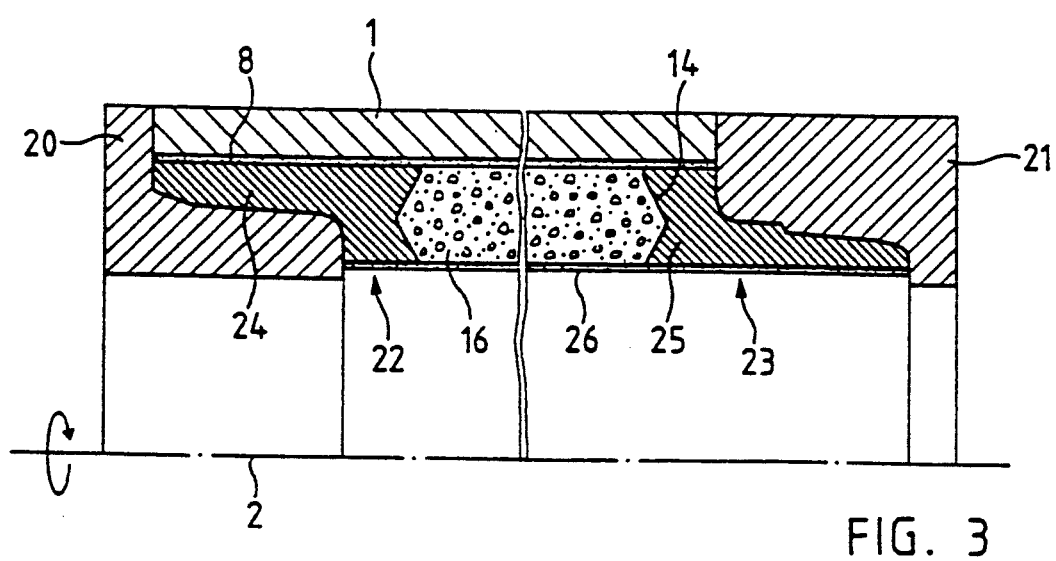
Figure 4:
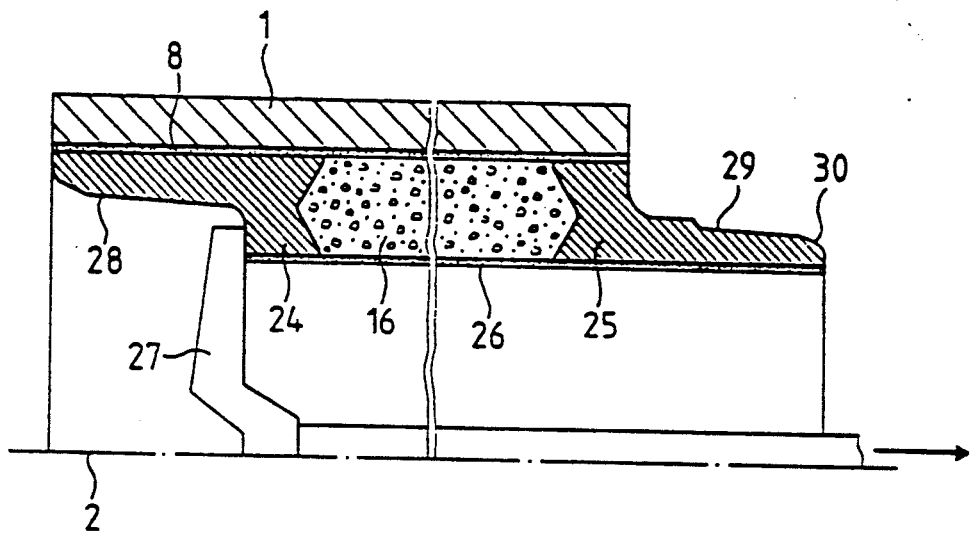

The length of drum 1 corresponds to the length of the pipe to be produced, while the spigot end, forming one pipe end and provided with an offset, projects over one drum end, cf. FIG. 3. According to FIG. 1, both drum ends 3, 4 are fitted with end rings 5, 6 which are, in turn, fixed to drum 1. Subsequently, the drum is accelerated to a desired speed and preferably a protective layer is applied with the aid of a charging device and, following the drying thereof, a reinforcing layer 8 is applied as the outer wall side. This reinforcing layer 8 essentially comprises a plastic material, e.g. a polyester, with which is admixed glass fibres. When the reinforcing layer 8 has a dried surface, the end rings 5, 6 are removed and replaced by a first shaping ring 10 and a second shaping ring 11. The shaping rings 10, 11 have annular portions 12, 13 projecting into the interior of the drum defining an annular space 15 in which is introduced a binder and inorganic core layer 16. Core layer 16 is made from a cement mortar or a concrete with or without fillers. Prior to the introduction of the core layer 16, dimensional measurements are taken to ensure a good connection between the reinforcing layer 8 and the core layer 16, e.g. by a plastic material.

Following the introduction and surface drying of core layer 16, the drum is stopped from rotating and the two shaping rings 10, 11 are removed from the drum and replaced by a third and a fourth shaping ring 20, 21, cf. FIG. 3. An open annular space 22, 23 is formed between the core layer 16 and the two shaping rings 20, 21 from whose cross-section it can be seen that such space 22, 23 relates to the actual socket connecting elements formed in the two annular spaces 22, 23. For this purpose, a socket material 24, 25 is introduced into the annular spaces 22, 23. The composition of the socket material corresponds to that of the reinforcing layer 8 on the outer wall side, so that once again an excellent connection is obtained. The socket material 24, 25 is connected to the reinforcing layer 8 as well as the frontal surface 14 of the core layer 16 such that a connecting layer results from a suitable plastic material when the pipes are fitted together. An inner wall side reinforcing layer 26 is now applied over the socket material 24, 25 as well as the core layer 16 and dried. Subsequently, a protective layer can be applied to the reinforcing layer 26.

This ends the production of the pipe and the drum 1 can now be stopped. The third and fourth shaping rings 20, 21 are removed and an extracting device 27, e.g. a spreader arm, is inserted in the drum to draw out the finished pipe. As can be seen from FIG. 4, at one pipe end the pipe has a projection 28 forming a socket end, while the other pipe end has a spigot end 30 provided with an offset 29.

Figure 5:
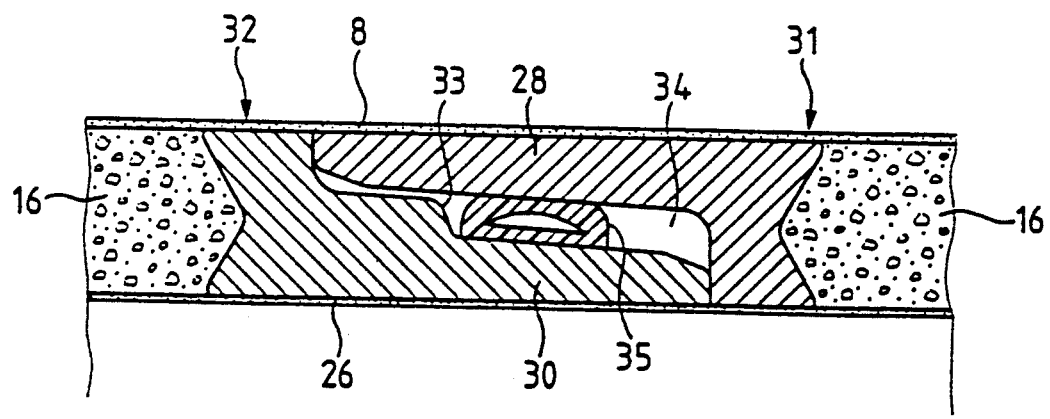
FIG. 5 is a partial section view through a finished socket connection with inserted seal produced for two composite pipes.
Figure 6:
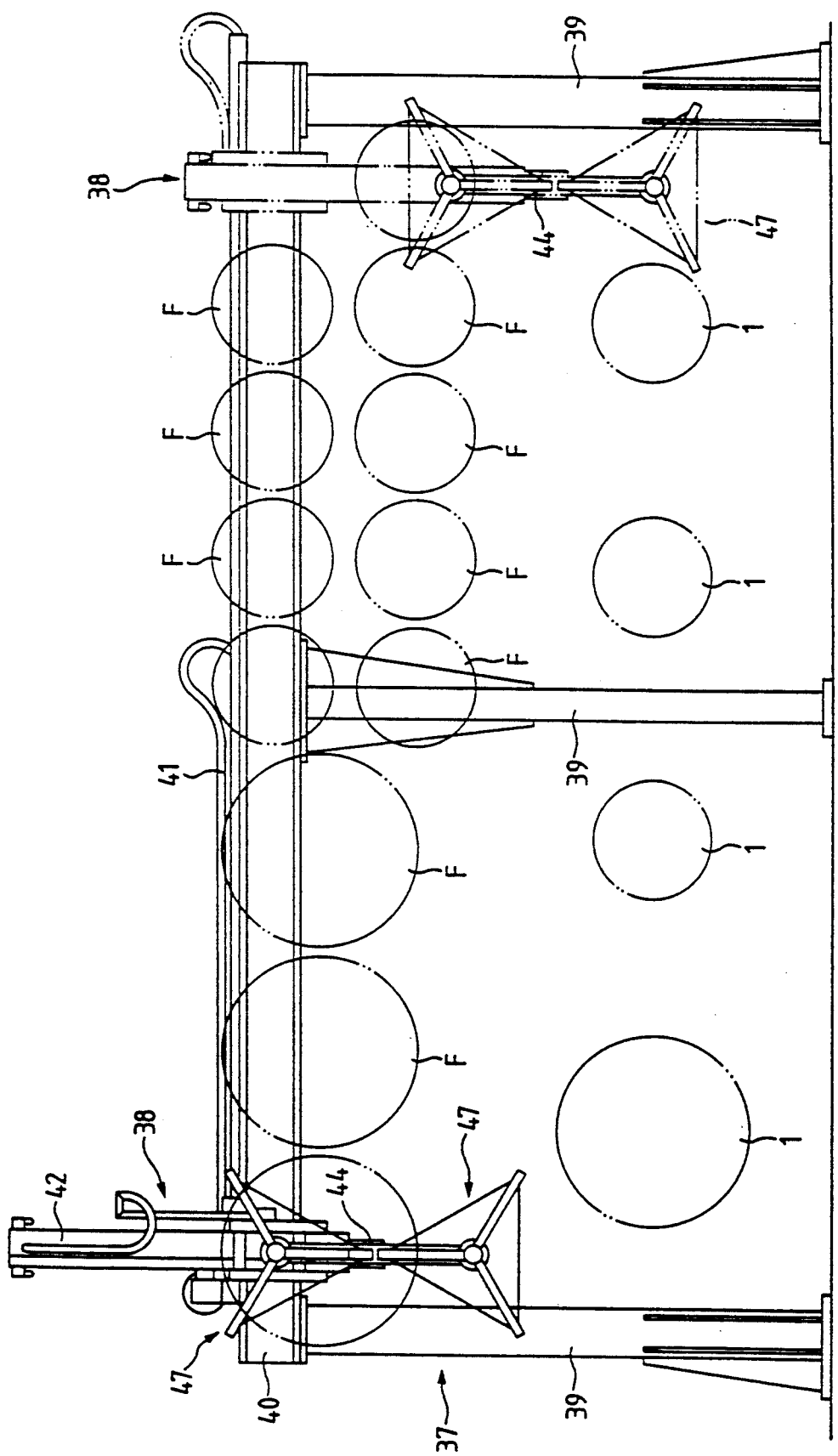
FIG. 6 is a front view of an apparatus for producing composite pipes.
Figure 7:
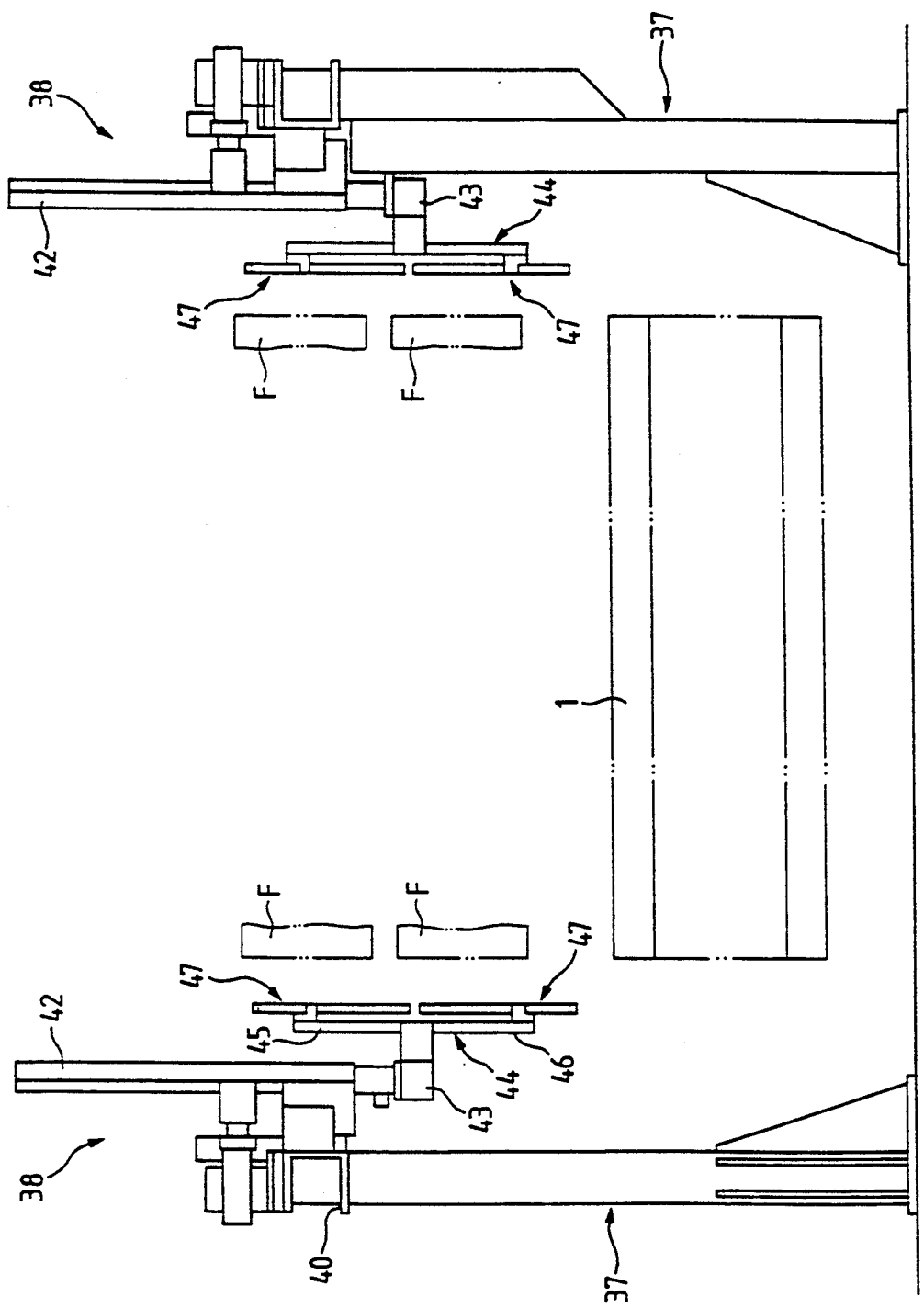
FIG. 7 is a side view of the apparatus of FIG. 6 from the inside.

FIG. 5 shows a socket connection or a junction of two pipes produced in accordance with the above-described method. One pipe 31 has a socket end 28, while the connecting pipe 32 has a spigot end 30. The spigot end 30 has a shoulder 33 for centering the socket end 28. An elastic sealing ring 35 is inserted in the annular space 34 formed between the socket end 28 and the spigot end 30 to ensure a drip-proof seal between the socket connection 28, 30. It is also noted that the same shaping rings can be used for different build-up phases of the pipe. Thus, the end ring 6 has the same construction as the fourth shaping ring 21. However, only the end face is required in the first phase according to FIG. 1 in order to form a termination for the reinforcing layer 8. Moreover, the third shaping ring 20 or first shaping ring 10 could be used as end ring 5, although the shaping ring would have to be turned over, making handling more difficult. It is therefore more appropriate to produce a separate end ring 5.

FIGS. 6 to 11 show an apparatus making it possible to manufacture composite pipes according to the production steps described relative to FIGS. 1 to 4. As can be seen from FIGS. 6 and 7, the rotating drums 1 are only diagrammatically shown. The number of drums 1 used per apparatus is dependent only on the production capacity. Thus, the arrangement of the apparatus is essentially the same and is independent of the number of drums 1.

A portal frame 37, facing each of the drum ends, is provided, on which at least one handling device 38 is disposed. As a function of the size of the apparatus, the portal frame 37 has two or more columns 39 over which is placed a cross-beam 40 for moving the handling device 38. To accommodate this, the handling device 38 also has a chassis with a portable motor, which can be supplied with power, e.g. electric or pneumatic power by means of a line 41.

The shaping rings (generally designated by F) are stored in a magazine (not shown) above the drums 1 for the production of the composite pipes. The shaping rings F can be fetched from the magazine via handling device 38 and brought to the drums 1. Conversely, when no longer required, shaping rings F can be returned from the handling device 38 to the magazine. For this purpose, the handling device 38 has a lifting unit 42 on whose lower end 43 (FIG. 7) is fixed a swivel column 44. So as not to overburden the drawing, the swivel column 44 is only diagrammatically shown, not including a hydraulic or pneumatic swivel drive. A gripper 47 is fixed to each of the two arms 46 of the swivel column 44 and has corresponding gripping means for holding the shaping rings F (see FIG. 9). Gripper 47 is equipped with three gripping arms 48, on which are arranged several fixing means for grasping shaping rings of different sizes, cf. FIGS. 8 and 10.

Figure 8:
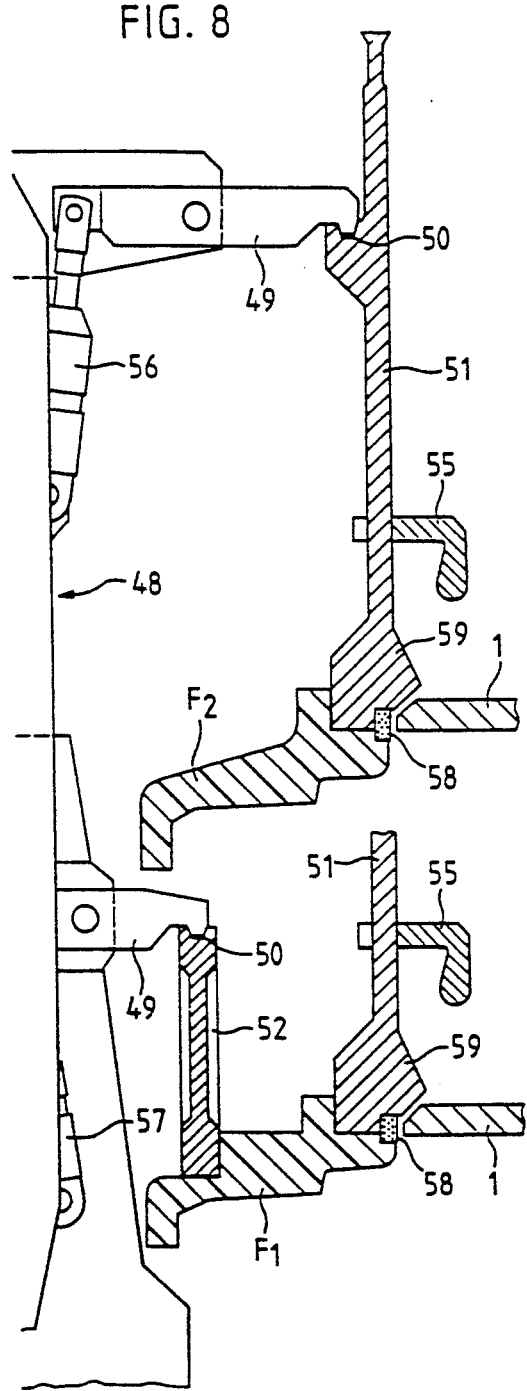
FIG. 8 is a section view of two shaping rings with holding elements.
Figure 11:
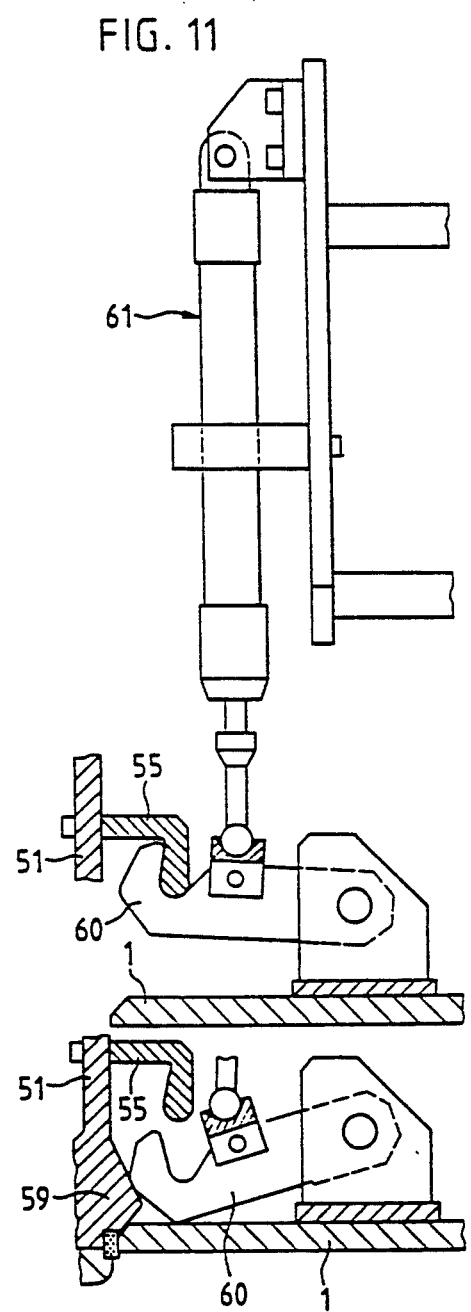
FIG. 11 is a side view of the holding elements on the drum circumference for holding the shaping rings on the drum.

FIG. 8 shows two shaping rings F1 and F2 together. In practice, only one shaping ring F is fixed to the end of the drum 1. However, the same gripping arm 48, diagrammatically shown in FIG. 8, is used for both shaping rings F and has two pivotable clamping fingers 49 for engagement in clamping slots 50 provided on a bearing ring 51, 52, to which the shaping rings F are fixed. Holding hooks 55 are fixed to the bearing rings 51, or an auxiliary bearing ring 52 (in the case of smaller diameter shaping rings) for docking of the shaping rings F with the drum, cf. FIG. 8. The shaping rings F are stored in the magazine by means of bearing rollers (not shown), on which the shaping rings are mounted.

It can be seen from FIG. 10 that the two clamping jaws 49, shown in FIG. 8, are actuated by means of gripping arm 48 provided with lifting elements 56, 57. The actuation of lifting elements 56, 57 leads to holding hooks 49 being either opened or closed whereby one end of the lifting elements 56, 57 is supported on the gripping arm 48, while the other end acts on the clamping jaw 49 actuating the latter.

It is also noted that a feed device, e.g. a sliding cylinder, is fitted at the lower end 43 of lifting unit 42 whereby the swivel column 44 can be slid into the gripping position for the shaping rings F. Thus, the handling device 38 can perform movements in the three axes in space as well as the additional swivelling movement of swivel column 44. Since the swivel column 44 carries two grippers 47, it is possible to fetch a shaping ring F from the magazine and move it to the particular drum, remove the used shaping drum, swivel the swivel column, and fix the new ring all in one step. The holding hooks 55 in bearing ring 51 are used for fixing the shaping rings F to drum 1. The inner circumference of the bearing rings 51 is provided with a seal 58 and an impact body 59, which engages on the frontal, bevelled end of the drum 1.

Swivel claws 60, which engage behind the holding hooks 55 and secure the bearing ring 51 on the outside of drum 1 are provided for fixing the shaping rings F to drum 1. The swivel hooks 60 are pivotably mounted and spring loaded on the outside of drum 1, e.g. by a torsion spring, so that they can be forced away from the outside of the drum. In order to engage the swivel claws 60 in the holding hooks 55 of shaping rings F, swivel claw 60 is forced down by a lifting cylinder unit 61. Swivel column 44 is then moved forwards until the impact body 59 of shaping rings F engages on the front of drum 1. Finally, the lifting cylinder unit 61 is retracted, allowing the swivel claw 60 to hook into the holding hook 55 under spring tension.

The described apparatus can be operated automatically. The necessary control system has a processor, which can be programmed, making it possible to simultaneously manufacture pipes of different diameters. Since a shaping ring change involves the changing of two shaping rings the two handling devices 38 at the ends of the drum 1 operate substantially synchronous with one another. The drum loading devices are located at one drum end and a corresponding number of loading units are provided with which the individual components can be introduced over the length of drum 1, as a function of the number of components used for the manufacture of a pipe. As a result of the automatic loading of drum 1 and the control of the individual movements, composite pipes can be produced which only have relatively limited tolerances. However, it is important that the automatic production of the composite pipes is ensured and that the pipes have a constant quality.

The disclosed invention is not to be limited by what has been particularly shown and described except as indicated by the present claims.

What is claimed is:

1. An apparatus for producing a layered composite pipe having a first end having a first socket connecting element, a second end having a second socket connecting element, a reinforcing layer on outer and inner wall sides and a core layer therebetween, said apparatus comprising:

at least one horizontally mounted rotatable drum for forming said layered composite pipe;

shaping rings removably attachable to said at least one horizontally mounted rotatable drum for shaping the socket connecting elements at the layered composite pipe ends;

a magazine located over said at least one horizontally mounted drum for storing the shaping rings; and at least one handling device adjacent each end of said at least one horizontally mounted rotatable drum for moving the shaping rings successively from said magazine to said ends of said at least one horizontally mounted rotatable drum during construction of the layered composite pipe, for fixing the rings to the at least one horizontally mounted rotatable drum and removing said shaping rings from said at least one horizontally mounted rotatable drum, and returning and replacing the shaping rings in the magazine.

2. An apparatus according to claim 1, wherein said at least one horizontally mounted rotatable drum has a longitudinal axis and said handling device comprises a chassis with a lifting unit movable at right angles to the longitudinal axis of said drum on a cross-beam of a portal frame and having on said lifting unit a vertically movable lifting rod carrying a gripper unit for gripping the shaping rings.

3. An apparatus according to claim 2, wherein the gripper unit is displaceable parallel to the drum axis.

4. An apparatus according to claim 3, wherein said gripper unit comprises a two-armed swivel column, each said arm having a respective gripper.

5. An apparatus according to claim 4, wherein said gripper has radially arranged gripping arms on which are mounted pivotable clamping jaws operable by lifting elements for grasping the shaping rings.

6. An apparatus according to claim 5, wherein said shaping rings are connected to a bearing ring on which clamping slits are provided for the engagement of said clamping jaws.

7. An apparatus according to claim 1, wherein swivel claws are fixed to the outer circumference of the two ends of the drum, said swivel claws being engageable behind holding hooks fixed to bearing rings attached to said shaping rings.

8. An apparatus according to claim 7, wherein the swivel claws are disengaged from the holding hooks by lifting cylinder units which are arranged on a fixed frame around the at least one horizontally mounted rotatable drum.

* * * * *

UNITED STATES PATENT AND TRADEMARK OFFICE
CERTIFICATE OF CORRECTION

PATENT NO. : 5,238,384
DATED : August 24, 1993
INVENTOR(S) : Peter Hartmann, et al It is certified that error appears in the above-indentified patent and that said Letters Patent is hereby corrected as shown below:

On the title page, under Item [30]: Foreign Application Priority Data, "04787/88" should read --04787/88-4--.

Signed and Sealed this

Fifth Day of July, 1994

Attest:

BRUCE LEHMAN

*Attesting Officer*    *Commissioner of Patents and Trademarks*